(12) United States Patent
Takamatsu et al.

(10) Patent No.: US 9,700,033 B2
(45) Date of Patent: Jul. 11, 2017

(54) COILED WAVE SPRING AND DRAG KNOB

(71) Applicant: Shimano Inc., Sakai, Osaka (JP)

(72) Inventors: Takuji Takamatsu, Osaka (JP);
Hirokazu Hiraoka, Osaka (JP);
Kenichi Kawagoshi, Osaka (JP)

(73) Assignee: Shimano Inc., Osaka (JP)

( * ) Notice: Subject to any disclaimer, the term of this patent is extended or adjusted under 35 U.S.C. 154(b) by 459 days.

(21) Appl. No.: 14/336,233

(22) Filed: Jul. 21, 2014

(65) Prior Publication Data
US 2015/0060586 A1 Mar. 5, 2015

(30) Foreign Application Priority Data
Aug. 28, 2013 (JP) ................................. 2013-177064

(51) Int. Cl.
| *A01K 89/01* | (2006.01) |
| *A01K 89/033* | (2006.01) |
| *A01K 89/02* | (2006.01) |
| *A01K 89/027* | (2006.01) |

(52) U.S. Cl.
CPC ............ *A01K 89/033* (2013.01); *A01K 89/02* (2013.01); *A01K 89/027* (2013.01)

(58) Field of Classification Search
CPC ..... A01K 89/02; A01K 89/027; A01K 89/033
See application file for complete search history.

(56) References Cited

U.S. PATENT DOCUMENTS

| 5,443,498 A * | 8/1995 | Fontaine .................. A61F 2/88 606/195 |
| 5,873,906 A * | 2/1999 | Lau .......................... A61F 2/07 128/898 |
| 2006/0231657 A1* | 10/2006 | Morise ................. A01K 89/027 242/244 |

(Continued)

FOREIGN PATENT DOCUMENTS

| JP | 6-10226 Y2 | 3/1994 |
| JP | 2002-39243 A | 6/2002 |

(Continued)

OTHER PUBLICATIONS

European Search Report of corresponding EP Application No. 14 18 0406.2 dated Jan. 28, 2015.

*Primary Examiner* — Emmanuel M Marcelo
(74) *Attorney, Agent, or Firm* — Global IP Counselors, LLP

(57) ABSTRACT

A coiled wave spring includes a first and second coiled portions. The first coiled portion has a plurality of first valley parts and a plurality of first peak parts. The first valley parts and the first peak parts are alternately disposed in a circumferential direction. The second coiled portion has a plurality of second peak parts and a plurality of second valley parts. The second peak parts respectively correspond to the first valley parts, whereas the second valley parts respectively correspond to the first peak parts. The second coiled portion extends continuously from the first coiled portion. The first peak parts are disposed away from the corresponding second (Continued)

valley parts at an interval in an axial direction. The first valley parts contact the corresponding second peak parts. Apices of the first valley parts are shifted from apices of the corresponding second peak parts in the circumferential direction.

13 Claims, 8 Drawing Sheets

(56) References Cited

U.S. PATENT DOCUMENTS

| | | | | |
|---|---|---|---|---|
| 2007/0228626 | A1* | 10/2007 | Suzuki | F16F 1/06 267/180 |
| 2009/0074831 | A1* | 3/2009 | Falotico | A61L 31/10 424/423 |
| 2010/0301149 | A1* | 12/2010 | Bin Ahmad | A01K 89/027 242/244 |
| 2010/0308148 | A1* | 12/2010 | Ng | A01K 89/027 242/243 |
| 2011/0106238 | A1* | 5/2011 | Williamson | A61F 2/915 623/1.16 |
| 2015/0005871 | A1* | 1/2015 | Shobayashi | A61F 2/88 623/1.15 |

FOREIGN PATENT DOCUMENTS

| | | |
|---|---|---|
| JP | 2012-205517 A | 10/2012 |
| WO | 2011/152025 A1 | 12/2011 |

* cited by examiner

COILED WAVE SPRING AND DRAG KNOB

CROSS-REFERENCE TO RELATED APPLICATIONS

This application claims priority to Japanese Patent Application No. 2013-177064 filed on Aug. 28, 2013, the entirety of which is hereby incorporated by reference in its entirety.

BACKGROUND

Field of the Invention

The present invention relates to a coiled wave spring and a drag knob using the same.

Background Information

A coil spring has been used as a component of a fishing reel. For example, a drag knob of a spinning reel includes a coil spring for applying drag force. The coil spring is produced by forming a wire rod with a circular cross-section in a helical shape. Therefore, chances are that the coil spring will be bent in the radial direction when being compressed.

To prevent the aforementioned radial bending, a drag knob described in Japan Laid-open Patent Application Publication No. JP-A-2012-205517 uses a coil spring that is produced by forming a wire rod with a rectangular cross-section in a helical shape as described in Japan Laid-open Patent Application Publication No. JP-A-2002-39243 and Japan Examined Utility Model Application Publication No. JP-Y-H06-10226. It should be noted that the coil spring is called a coiled wave spring formed in a wave shape along the circumferential direction.

The aforementioned coiled wave spring expands in the radial direction when being compressed. As a result, one drawback is that a spinning reel is required to reliably produce a space to cope with the radial expansion of the coiled wave spring. It should be noted that this drawback is similarly produced even when the coiled wave spring is used for any components other than the drag knob.

It is an object of the present invention to provide a coiled wave spring that can be prohibited from expanding in the radial direction when being compressed, and further, to provide a drag knob using the same.

SUMMARY

A coiled wave spring according to a first aspect of the present invention is a coiled wave spring in use for a fishing reel. The coiled wave spring includes a single turn of a first coiled portion and a single turn of a second coiled portion. The first coiled portion has a plurality of first valley parts and a plurality of first peak parts. The first valley parts and the first peak parts are alternately disposed in a circumferential direction. The second coiled portion has a plurality of second peak parts and a plurality of second valley parts. The second peak parts respectively correspond to the first valley parts, whereas the second valley parts respectively correspond to the first peak parts. Further, the second coiled portion extends continuously from the first coiled portion. Moreover, the first peak parts are disposed away from the respectively corresponding second valley parts at an interval in an axial direction. The first valley parts contact the respectively corresponding second peak parts. Apices of the first valley parts are shifted from apices of the corresponding second peak parts in the circumferential direction.

In the coiled wave spring structure, as described above, the apices of the first valley parts are shifted from the apices of the corresponding second peak parts in the circumferential direction. Therefore, the coiled wave spring can be prohibited from expanding in the radial direction when being compressed. It should be noted that the coiled wave spring is preferably used for pressing a brake member of a fishing reel.

Preferably, the coiled wave spring further includes a single turn of a third coiled portion. The third coiled portion has a plurality of third valley parts and a plurality of third peak parts. The third valley parts respectively correspond to the first valley parts, whereas the third peak parts respectively correspond to the first peak parts. Further, the third coiled portion extends continuously from the second coiled portion. Moreover, the third valley parts are disposed away from the corresponding second peak parts at an interval in the axial direction. The third peak parts contact the corresponding second valley parts. Apices of the third peak parts are shifted from apices of the corresponding second valley parts in the circumferential direction.

According to the structure, the apices of the third peak parts are shifted from the apices of the corresponding second valley parts in the circumferential direction. Therefore, the coiled wave spring can be prohibited from expanding in the radial direction when being compressed.

Preferably, in a plan view, an angle of greater than 0 degrees and less than or equal to 360/2N degrees is formed by a line connecting the apex of each first valley part and a center of the coiled wave spring and a line connecting the apex of each third valley part corresponding to each first valley part and the center. It should be noted that N is defined as a total number of the first valley parts and the first peak parts in the first coiled portion. According to the structure, the coiled wave spring can be further prohibited from expanding in the radial direction when being compressed.

Preferably, in a side view, an angle of greater than or equal to 10 degrees and less than or equal to 30 degrees is formed by a line connecting each corresponding pair of the apex of each first valley part and the apex of each third valley part and a line extending in the axial direction.

According to the structure, the coiled wave spring can be further prohibited from expanding in the radial direction when being compressed.

Preferably, the first valley parts are disposed at equal intervals in the circumferential direction, while the first peak parts are disposed at equal intervals in the circumferential direction. According to the structure, the coiled wave spring can apply a more stable urging force.

A drag knob according to a second aspect of the present invention is a drag knob for regulating a drag force of a drag mechanism configured to brake a rotation of a spool rotatably mounted to a reel unit of a fishing reel. The drag knob includes an operating member, any of the aforementioned forms of coiled wave spring, and a receiving member. The operating member is rotatably mounted to the reel unit. The coiled wave spring is configured to be extended and contracted in a rotational axis direction of the operating member in conjunction with a rotation of the operating member. The receiving member is configured to receive an urging force of the coiled wave spring and apply the drag force to the spool.

According to the structure, the drag knob uses the coiled wave spring structured as described above. Therefore, the space produced within the drag knob can be effectively utilized.

According to the present invention, it is possible to provide a coiled wave spring that is prohibited from expanding in the radial direction, and further, to provide a drag knob using the same.

BRIEF DESCRIPTION OF THE DRAWINGS

Referring now to the attached drawings which form a part of this original disclosure.

DETAILED DESCRIPTION OF THE EMBODIMENTS

Figure 1:
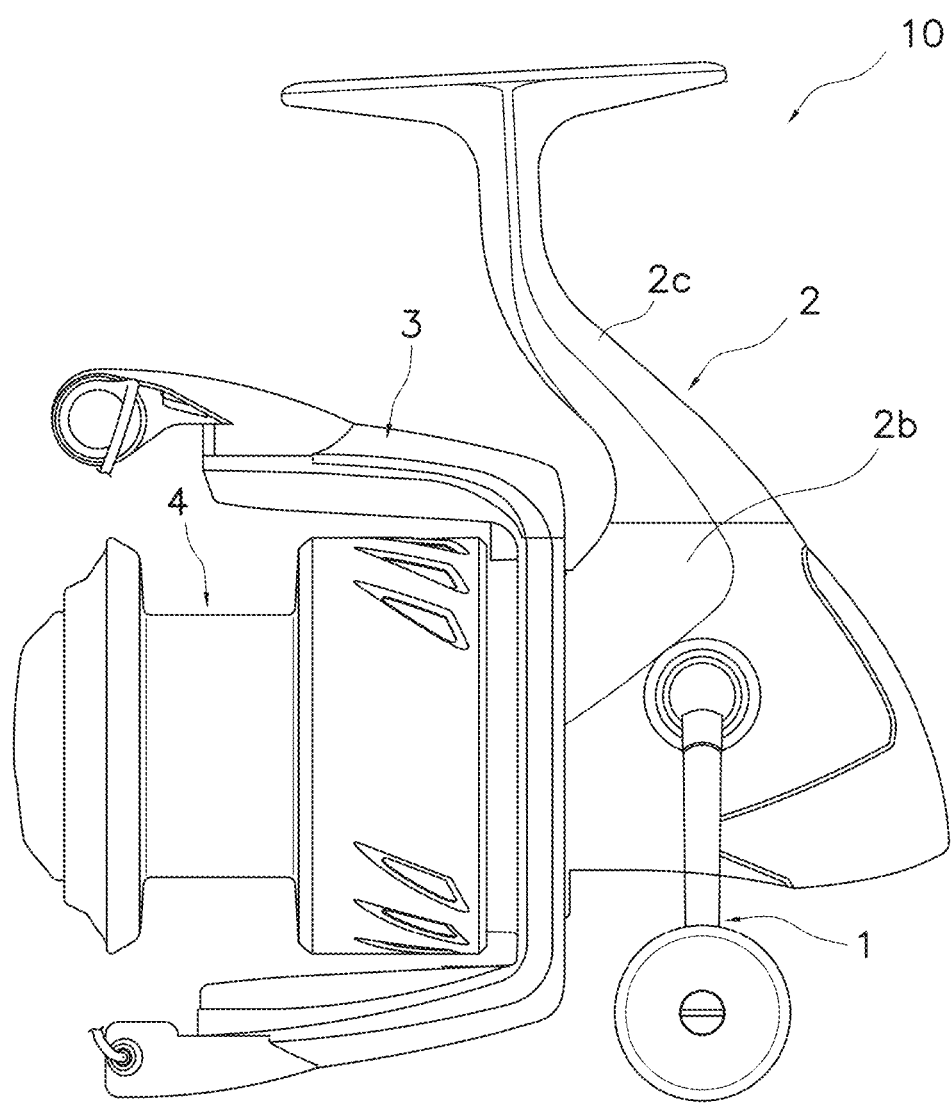
FIG. 1 is a side view of a spinning reel.
Figure 2:
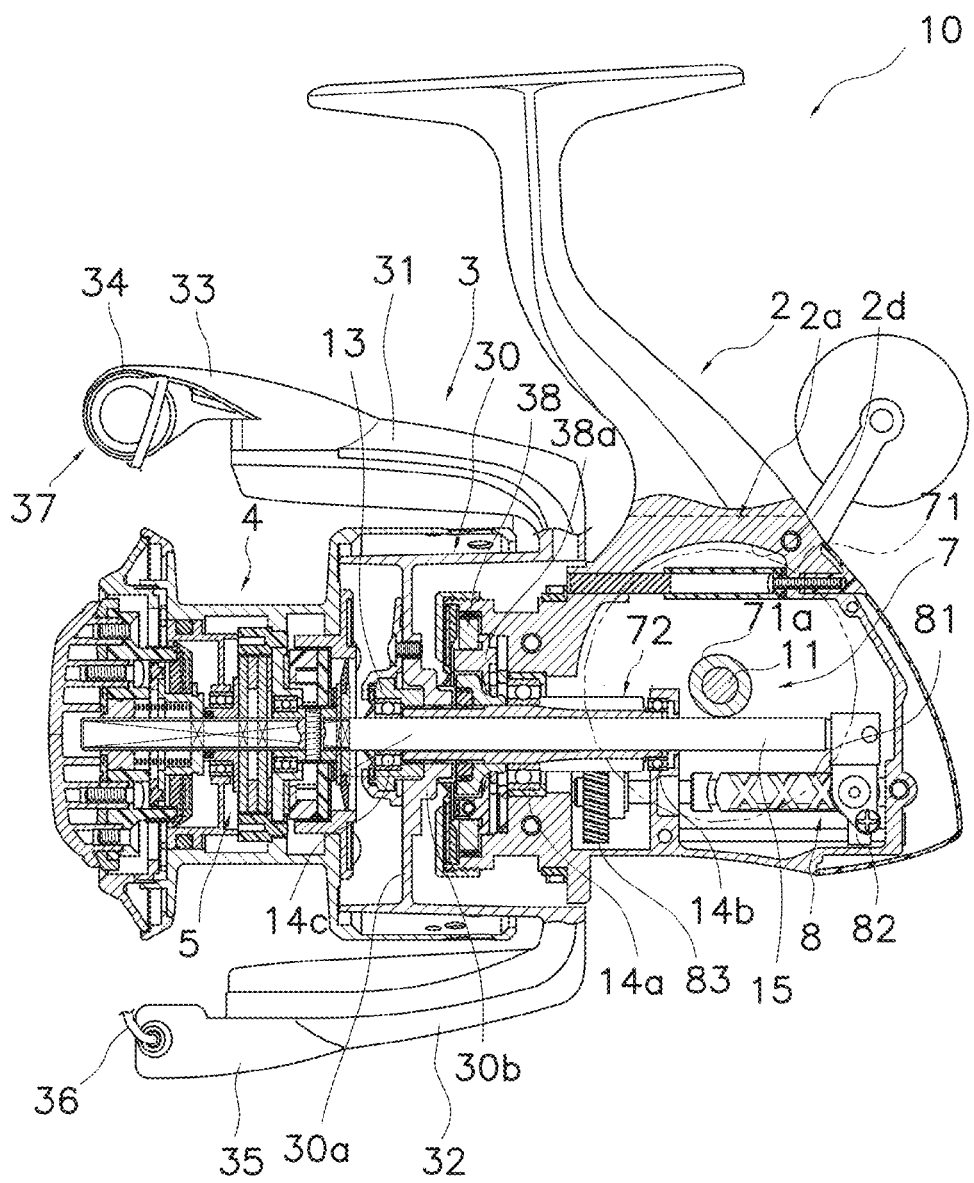
FIG. 2 is a cross-sectional side view of the spinning reel.

An exemplary embodiment of the present invention will be hereinafter explained with reference to the attached drawings. FIG. 1 is a side view of a spinning reel, whereas FIG. 2 is a cross-sectional side view of the spinning reel. It should be noted that in the following explanation, the term "front" indicates a left side in FIGS. 1 and 2; the term "rear" indicates a right side in FIGS. 1 and 2; and the term "back-and-forth direction" means a right-and-left direction in FIGS. 1 and 2.

Figure 3:
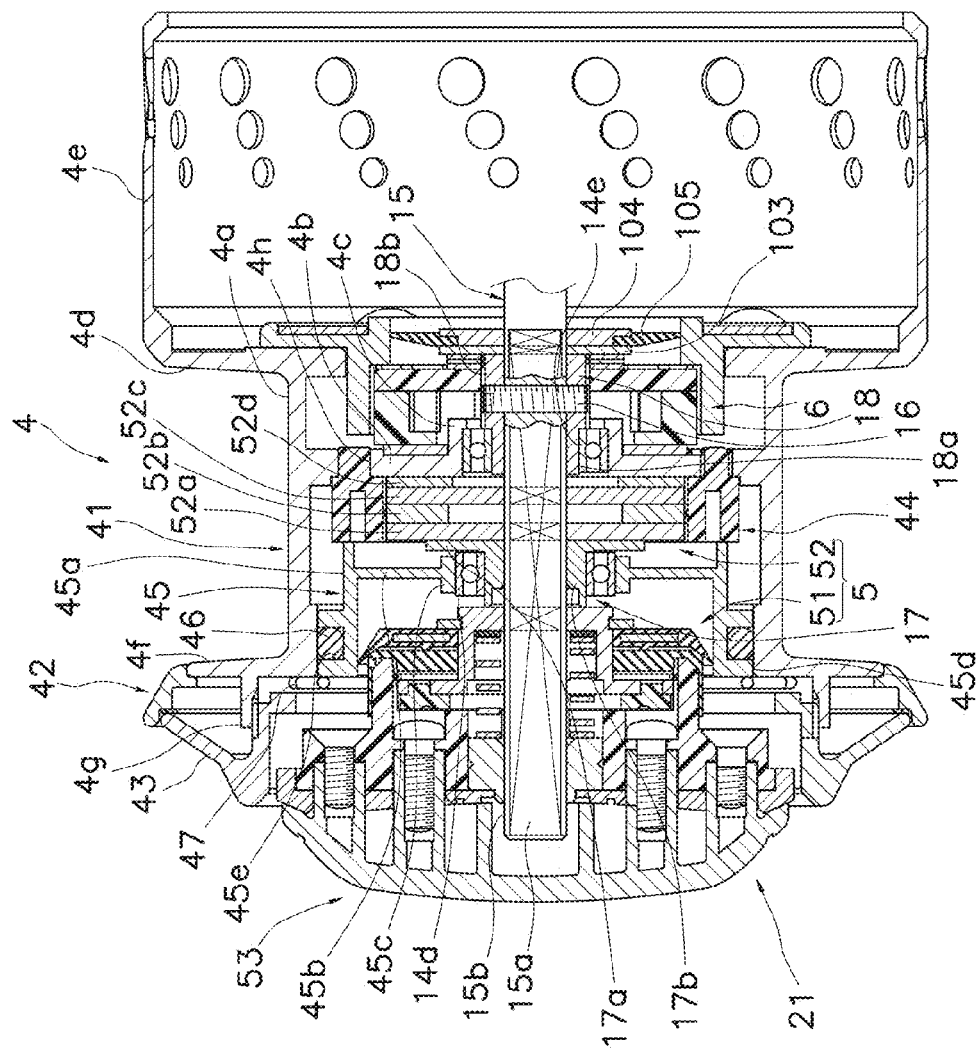
FIG. 3 is a cross-sectional side view of a spool.

As illustrated in FIGS. 1 and 2, a spinning reel 10 includes a handle 1, a reel unit 2, a rotor 3, a spool 4, a drag mechanism 5 and a drag sound producing mechanism 6 (see FIG. 3). The reel unit 2 supports the handle 1 in a rotatable state. The rotor 3 is a member for winding a fishing line about the spool 4. The rotor 3 is rotatably supported at the front of the reel unit 2. The spool 4 is configured to wind the fishing line onto the outer peripheral surface thereof, and is disposed at the front of the rotor 3 so as to be movable back and forth. It should be noted that the handle 1 is attachable to either the left side or the right side of the reel unit 2. The drag mechanism 5 and the drag sound producing mechanism 6 are accommodated in the spool 4.

(Structure of Reel Unit)

The reel unit 2 includes a reel body 2a, a lid member 2b and a leg portion 2c. The reel body 2a has an opening 2d. The lid member 2b is detachably attached to the reel body 2a so as to close the opening 2d. The kg portion 2c is a portion for attaching the spinning reel 10 to a fishing rod. The leg portion 2c extends obliquely upward and forward from the reel body 2a. The reel body 2a and the lid member 2b may be made of, for instance, aluminum alloy. The reel body 2a has a space in the interior thereof. The inner space accommodates a rotor drive mechanism 7 and an oscillating mechanism 8, which are to be described.

As illustrated in FIG. 2, the rotor drive mechanism 7 is a mechanism configured to rotate the rotor 3 in conjunction with the rotation of the handle 1. The rotor drive mechanism 7 includes a main gear 71 and a pinion gear 72. The main gear 71 is configured to be rotated together with a main gear shaft 71a to which a handle shaft 11 of the handle 1 is fixed.

The pinion gear 72 is meshed with the main gear 71. The pinion gear 72 is formed in a tubular shape and extends in the back-and-forth direction. The front part of the pinion gear 72 is fixed to the rotor 3 through a nut 13, while penetrating through the center part of the rotor 3. On the other hand, the intermediate and rear end parts of the pinion gear 72 are rotatably supported by the reel body 2a through bearings 14a and 14b. Specifically, the bearings 14a and 14b are attached to the reel body 2a, while being disposed at a predetermined interval. The bearing 14a supports the intermediate part of the pinion gear 72, whereas the bearing 14b supports the rear end part of the pinion gear 72.

The oscillating mechanism 8 is a mechanism configured to move the spool 4 back and forth. When described in more detail, the oscillating mechanism 8 is a mechanism configured to move a spool shaft 115 (an exemplary rotational shaft) in the back-and-forth direction in order to move the spool 4 in the same direction as the spool shaft 15. It should be noted that the spool shaft 15 is coupled to the center part of the spool 4 through the drag mechanism 5.

The oscillating mechanism 8 includes a worm shaft 81, a slider 82 and an intermediate gear 83. The worm shaft 81 is disposed below and in parallel to the spool shaft 15. The slider 82 is configured to be moved along the worm shaft 81 in the back-and-forth direction. The rear end of the spool shaft 15 is non-rotatably fixed to the slider 82. The intermediate gear 83 is fixed to the tip end of the worm shaft 81, while being meshed with the pinion gear 72.

The spool shaft 15 is disposed while axially penetrating through the pinion gear 72. The spool shaft 15 is configured to be reciprocated in the back-and-forth direction by the oscillating mechanism 8. The intermediate part of the spool shaft 15 is supported by a bearing 14c mounted to the inside of the nut 13, while being axially movable. On the other hand, the rear part of the spool shaft 15 is supported by the inner peripheral surface of the rear part of the pinion gear 72, while being axially movable.

The spool shaft 15 is non-rotatable, whereas the pinion gear 72 is rotatable relatively to the spool shaft 15. Electroless Ni plating has been applied to the surface of the spool shaft 15. The spool shaft 15 is thereby prevented from getting stuck with the pinion gear 72 when being moved back and forth while being rotated relatively to the pinion gear 72.

Figure 4:
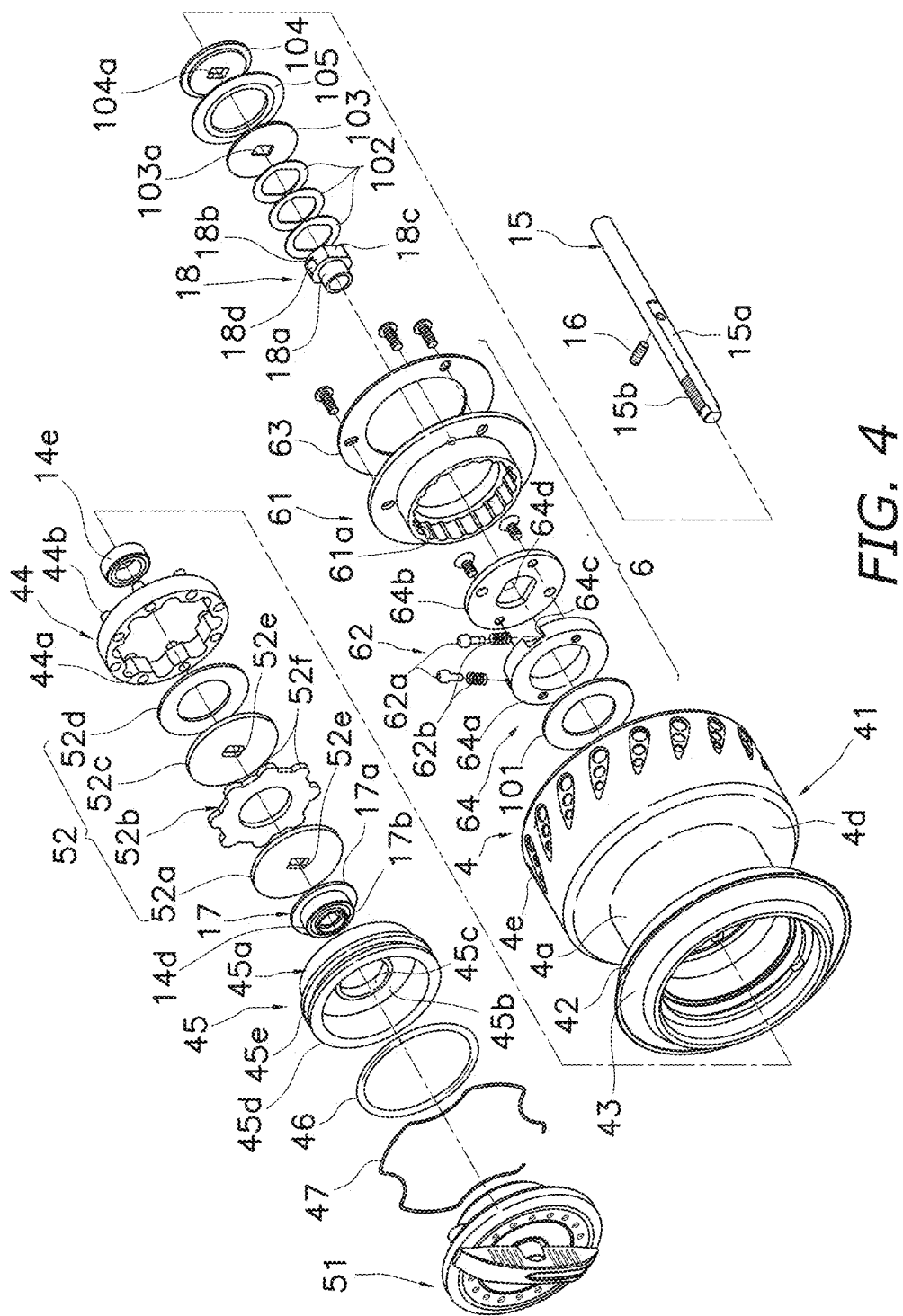
FIG. 4 is an exploded perspective view of the spool.

FIG. 3 is a cross-sectional side view of the spool 4. FIG. 4 is an exploded perspective view of the spool 4. As illustrated in FIGS. 3 and 4, a pair of lock surfaces 15a and a pair of male threaded parts 15b are formed on the front end part of the spool shaft 15. The pair of lock surfaces 15a is composed of surfaces disposed in parallel to each other.

(Structure of Rotor)

As illustrated in FIG. 2, the rotor 3 has a cylindrical portion 30, a first rotor arm 31 and a second rotor arm 32. The first rotor arm 31 and the second rotor arm 32 are disposed laterally to the cylindrical portion 30, while being opposed to each other. The cylindrical portion 30, the first rotor arm 31 and the second rotor arm 32 are integrally molded.

The cylindrical portion 30 has a front wall 30a formed in the front part thereof. Further, the front wall 30a has a boss 30b disposed in the middle part thereof. The boss 30b has a through hole bored in the center part thereof. The front part of the pinion gear 72 and the spool shaft 15 penetrate through the through hole. The nut 13 is disposed in front of the front wall 30a. The rotor 3 is fixed to the front part of the pinion gear 72 through the nut 13.

The first rotor arm 31 forwardly extends from the cylindrical portion 30 while curving outward in a convex shape. A first bail support member 33 is pivotably mounted to the tip end part of the first rotor arm 31. A line roller 34 is mounted to the tip end part of the first bail support member 33 in order to lead the fishing line onto the spool 4.

The second rotor arm 32 forwardly extends from the cylindrical portion 30 while curving outward in a convex shape. A second bail support member 35 is pivotably mounted to the tip end part of the second rotor arm 32. A bail 36 is fixed between the line roller 34 and the second bail support member 35. The bail 36 is formed by curving a wire rod in a roughly U-shape. The first bail support member 33, the second bail support member 35, the line roller 34 and the bail 36 form a bail arm 37. The bail arm 37 is pivotable between a fishing-line guide position illustrated in FIG. 1 and a fishing-line release position inverted therefrom.

The cylindrical portion 30 of the rotor 3 accommodates an anti-reverse mechanism 38 in the interior thereof. The anti-reverse mechanism 38 is configured to prevent or allow the reverse rotation of the rotor 3. The anti-reverse mechanism 38 includes a one-way clutch 38a and a switch lever (not illustrated in the drawings). The one-way clutch 38a is of a roller type with a free-wheeling inner race. The one-way clutch 38a can be switched between an activation state (or referred to as a reverse rotation preventing state) and a deactivation state (or referred to as a reverse allowing state) in response to an operation of the switch lever.

(Structure of Spool)

As illustrated in FIG. 2, the spool 4 is attached to the front end part of the spool shaft 15, while being disposed between the first rotor arm 31 and the second rotor arm 32. As illustrated in FIG. 3, the spool 4 includes a spool main body 41, a spool ring 42, a ring fixing member 43, a tubular drag accommodating portion 44 and a tubular support portion 45.

The spool main body 41 is made of for instance, aluminum alloy. The spool main body 41 has a bobbin trunk 4a, a support wall part 4b, a shaft strut part 4c, a rear flange part 4d, a cylindrical part 4e and a front flange part 4f. The spool main body 41 accommodates the drag mechanism 5 to be described and the drag sound producing mechanism 6 to be described in the interior thereof.

The bobbin trunk 4a is a portion that the fishing line is wound thereabout. The bobbin trunk. 4a is a cylindrical portion, and the center axis thereof is substantially matched with the spool shaft 15. The support wall part 4b is a disc-shaped part integrally formed on the inner peripheral surface of the bobbin trunk 4a. The shaft strut part 4c is a tubular part formed on the inner peripheral side of the support wall part 4b.

The rear flange part 4d radially extends from the rear end of the bobbin trunk 4a. The cylindrical part 4e is formed in a cylindrical shape and backwardly extends from the outer peripheral edge of the rear flange part 4d. The cylindrical portion 30 of the rotor 3 is disposed inside the cylindrical part 4e.

The front flange part 4f radially extends from the front end of the bobbin trunk 4a. The spool ring 42, made of metal, is attached to the outer peripheral surface of the front flange part 4f. Therefore, the fishing line can be smoothly released from the bobbin trunk 4a. It should be noted that the outer peripheral surface of the spool ring 42 is a slope with a diameter gradually increasing to the forward. The spool ring 42 is fixed to the front flange part 1f by the ring fixing member 43. The ring fixing member 43 is screwed into a female threaded part 4g. The female threaded part 4g is a tubular part forwardly protruding from the front flange part 4f.

As illustrated in FIGS. 3 and 4, the tubular drag accommodating portion 44 is a member for accommodating the drag mechanism 5, and is mounted to the support wall part 4b. The tubular drag accommodating portion 44 is disposed on the front side of the support wall part 4b. Further, the tubular drag accommodating portion 44 is unitarily rotatable with the spool main body 41.

The tubular drag accommodating portion 44 accommodates a friction portion 52 (to be described) of the drag mechanism 5 in the interior thereof. A plurality of (e.g., eight) semicircular lock recesses 44a are formed on the inner peripheral surface of the tubular drag accommodating portion 44, while being circumferentially aligned at intervals. On the other hand, a plurality of engaging holes 4h are bored in the support wall part 4b of the spool main body 41, while being circumferentially aligned at intervals. A plurality of engaging protrusions 44b, formed on the rear surface of the tubular drag accommodating portion 44, are respectively engaged with the engaging holes 4h. With the structure, the tubular drag accommodating portion 44 is unitarily rotated with the spool main body 41.

The tubular support portion 45 is disposed on the front side of the tubular drag accommodating portion 44. Further, the tubular support portion 45 supports the spool main body 41 in cooperation with the shaft strut part 4c such that the spool main body 41 is rotatable with respect to the spool shaft 15. When described in detail, the tubular support portion 45 has a tubular mount part 45a, a circular wall part 45b and a shaft strut part 45c. The tubular mount part 45a is fitted to the inner peripheral surface of the bobbin trunk 4a. The circular wall part 45b is integrally formed with the inner peripheral surface of the tubular mount part 45a. The shaft strut part 45c is formed in a tubular shape on the inner peripheral side of the circular wall part 45b. A front side outer peripheral surface 45d of the tubular mount part 45a is formed with a diameter greater than that of the rest of the outer peripheral surface of the tubular mount part 45a. The front side outer peripheral surface 45d is fitted to the inner peripheral surface of the bobbin trunk 4a. An annular groove 45e is formed on the front side outer peripheral surface 45d. An O-ring 46 is fitted into the annular groove 45e. Accordingly, it is possible to prevent intrusion of liquid to the rearward of the tubular support portion 45 through a clearance produced between the bobbin trunk 4a and the tubular support portion 45.

The rear surface of the tubular support portion 45 is contacted to the front surface of the tubular drag accommodating portion 44. The tubular support portion 45 is retained together with the tubular drag accommodating portion 44 by a retainer spring 47. The retainer spring 47 is made of a wire rod, and is attached to the interior of the spool 4 while being disposed in front of the tubular support portion 45. The retainer spring 47 is held between the front surface of the spool main body 41 and the rear surface of the ring fixing member 43.

A first support portion 17 and a second support portion 18 are fitted onto the outer peripheral surface of the spool shaft 15. A bearing 14d is mounted to the first support portion 17, whereas a bearing 14e is mounted to the second support portion 18. The spool 4 is thereby supported so as to be rotatable with respect to the spool Shaft 15.

The first support portion 17 is rotatably mounted to the spool shaft 15. The first support portion 17 has a brimmed part 17a and a tubular part 17b. The tubular part 17b is formed in a cylindrical shape, whereas the brimmed part 17a radially extends from the rear end of the tubular part 17b.

The first support portion 17 is disposed between a drag knob 51 and the friction portion 52, while making contact with both of them. An inner race of the bearing 14d is swaged to the outer peripheral surface of the tubular part 17b of the first support portion 17. An outer race of the bearing 14d is mounted to the shaft strut part 45c of the tubular support portion 45.

The second support portion 18 is fixed to the rear parts of the lock surfaces 15a of the spool shaft 15. The second support portion 18 is a two-tier (large and small) stepped tubular member having a small diameter part 18a and a large diameter part 18*b*. An inner race of the bearing 14*e* is mounted to the small diameter part 18*a*. An outer race of the bearing 14*e* is mounted to the shah strut part 4*c* of the spool main body 41.

A pair of first lock surfaces 18*c* and a pair of second lock surfaces 18*d* are formed on the large diameter part 18*b* of the second support portion 18. The first lock surfaces 18*c* are composed of a pair of surfaces formed in parallel to each other. Similarly, the second lock surfaces 18*d* are composed of a pair of surfaces formed in parallel to each other. The extending direction of the first lock surfaces 18*c* and that of the second lock surfaces 18*d* are oriented perpendicularly to each other. It should be noted that the second support portion 18 is non-rotatably fixed to the spool shah 15 by a locking screw 16.

(Structure of Drag Mechanism)

The drag mechanism 5 is a mechanism configured to brake the rotation of the spool 4 in the fishing-line releasing direction in order to apply drag force to the spool 4. As illustrated in FIGS. 3 and 4, the drag mechanism 5 includes the drag knob 51 and the fiction portion 52.

(Structure of Drag Knob)

Figure 5:
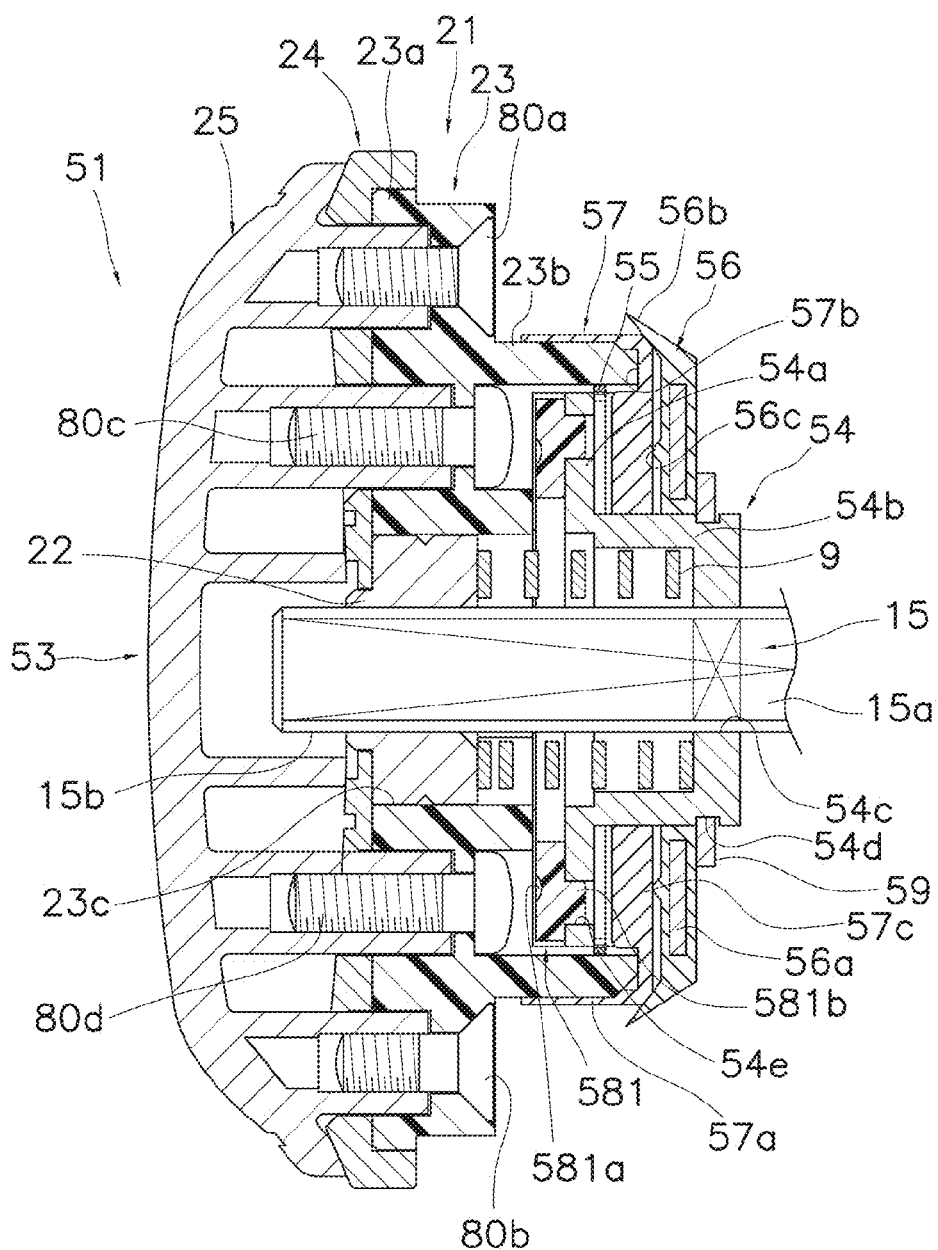
FIG. 5 is a cross-sectional side view of a drag knob.
Figure 6:
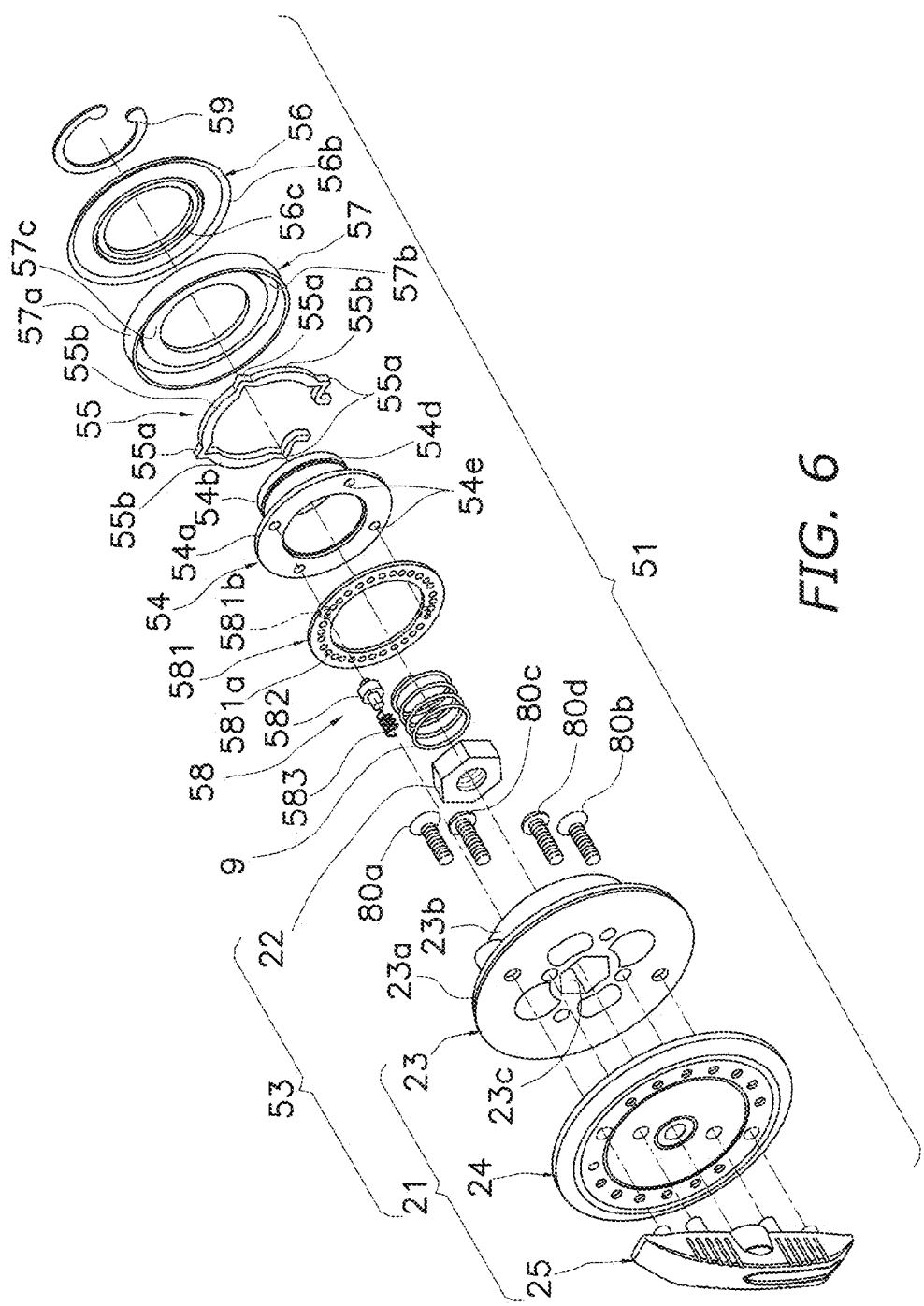
FIG. 6 is an exploded perspective view of the drag knob.

As illustrated in FIGS. 5 and 6, the drag knob 51 includes an operating member 53, a coiled wave spring 9 and a receiver member 54. Moreover, the drag knob 51 further includes a coupling member 55, a first seal member 56, a second seal member 57 and a knob sound producing mechanism 58.

The operating member 53 is disposed in opposition to the receiver member 54, while being rotatable relatively thereto. The operating member 53 is a member rotatably mounted to the reel unit 2. Specifically, the operating member 53 is screwed onto the spool shaft 15. The operating member 53 includes a knob unit 21 and a nut portion 22. The nut portion 22 is mounted to the knob unit 21 so as to be non-rotatable and axially movable. Further, the nut portion 22 is screwed onto the spool shaft 15.

The knob unit 21 includes a knob main body 23, a cover portion 24 and an operating portion 25. Four bolt members 80*a* to 80*d* are inserted into the knob main body 23 from the rear surface side. The bolt members 80*a* to 80*d* are screwed into the operating portion 25, while penetrating through the cover portion 24. The cover portion 24 and the operating portion 25 are thereby fixed to the knob main body 23.

The knob main body 23 is made of synthetic resin and has a disc part 23*a* and a protruding part 23*b*. The protruding part 23*b* is formed in a tubular shape and has a diameter less than that of the disc part 23*a*. The protruding part 23*b* backwardly protrudes from the disc part 23*a*. The front part of the receiver member 54 is accommodated within the protruding part 23*b*. A nut accommodating part 23*c* for accommodating the nut portion 22 is formed in the inner peripheral part of the knob main body 23. Within the nut accommodating part 23*c*, the nut portion 22 is axially movable with respect to the knob main body 23. Further, the nut portion 22 is unitarily rotated with the knob main body 23.

The cover portion 24 is made of metal, and is fixed to the front surface of the knob main body 23. The cover portion 24 is formed so as to cover the front surface and a part of the outer peripheral surface of the disc part 23*a* of the knob main body 23. The front surface of the cover portion 24 is recessed such that the thickness thereof is gradually reduced toward the center part thereof. The operating portion 25 is disposed along the diameter of the cover portion 24, while forwardly protruding from the cover portion 24.

The nut portion 22 is, for instance, a hexagonal nut. The nut portion 22 is screwed onto the male threaded parts 15*b* of the spool shaft 15. The rear surface of the nut portion 22 is contacted to the front surface of the coiled wave spring 9. The nut portion 22 is configured to be moved along the spool shaft 15 when being unitarily rotated with the knob main body 23. The coiled wave spring 9 is accordingly compressed or extended by the nut portion 22.

The coiled wave spring 9 is configured to be compressed or extended in accordance with the rotation of the operating member 53. The coded wave spring 9 is disposed between the operating member 53 and the receiver member 54. It should be noted that the coiled wave spring 9 is preferably disposed in a compressed state.

Figure 7:
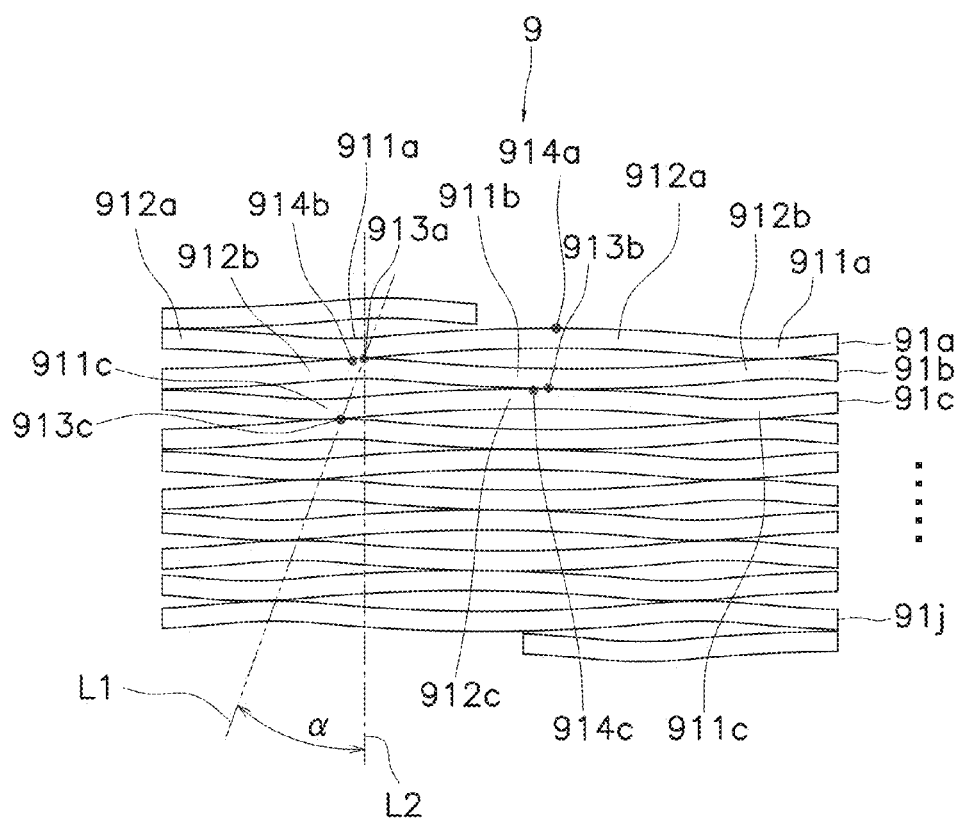
FIG. 7 is a side view of a coiled wave spring.

FIG. 7 is a side view of the coiled wave spring 9. As illustrated in FIG. 7, the coiled wave spring 9 is produced by forming a wire rod with a rectangular cross-section in a helical shape. The inner diameter of the coiled wave spring 9 is greater than the outer diameter of the spool shaft 15. Thus, the coiled wave spring 9 does not make contact with the spool shaft 15. The coiled wave spring 9 is preferably made of stainless steel for spring application.

The coiled wave spring 9 has a plurality of coiled portions 91*a* to 91*j*. It should be noted that a single coiled portion herein means a portion corresponding to a single turn of the coiled wave spring 9. In the present exemplary embodiment, for instance, the effective number of turns of the coiled wave spring 9 is 10. In other words, the coiled wave spring 9 has 10 coiled portions 91*a* to 91*j*.

The first coiled portion 91*a* has a plurality of first valley parts 911*a* and a plurality of first peak parts 912*a*. The first valley parts 911*a* and the first peak parts 912*a* are alternately disposed in the circumferential direction. Further, the first valley parts 911*a* are disposed at equal intervals in the circumferential direction, while the first peak parts 912*a* are disposed at equal intervals in the circumferential direction. The second coiled portion 91*b* extends continuously from the first coiled portion 91*a*, while being located under the first coiled portion 91*a*. The second coiled portion 91*b* has a plurality of second valley parts 911*b* and a plurality of second peak parts 912*b*. The second valley parts 911*b* and the second peak parts 912*b* are alternately disposed in the circumferential direction. Further, the second valley parts 911*b* are disposed at equal intervals in the circumferential direction, while the second peak parts 912*b* are disposed at equal intervals in the circumferential direction. It should be noted that the second valley parts 911*b* respectively correspond to the first peak parts 912*a*, whereas the second peak parts 912*b* respectively correspond to the first valley parts 911*a*. When a circumferential distance between given two elements is the closest in a view seen from the axial direction (i.e., the up-and-down direction in FIG. 7), these elements are expressed as "corresponding" to each other. For example, a given one of the second valley parts 911*b* corresponds to one of the first peak parts 912*a* located closest to the given one of the second valley parts 911*b* in the circumferential direction.

The first peak parts 912*a* are respectively disposed away from the corresponding second valley parts 911*b* in the axial direction. Further, the first valley parts 911*a* are respectively contacted to the corresponding second peak parts 912*b*. Yet further, apices 913*a* of the first valley parts 911*a* are respectively shifted from apices 914*b* of the corresponding second peak parts 912*b* in the circumferential direction. It should be noted that the circumferential shift direction is unidirectional. For example, the apices 913*a* of the first valley parts 911*a* are respectively shifted from the apices 914*b* of the corresponding second peak parts 912b in the circumferentially clockwise direction. Alternatively, the apices 913a of the first valley parts 911a are respectively shifted from the apices 914b of the corresponding second peak parts 912b in the circumferentially counterclockwise direction.

The third coiled portion 91c extends continuously from the second coiled portion 91b, while being located under the second coiled portion 91b. The third coiled portion 91c has a plurality of third valley parts 911c and a plurality of third peak parts 912c. The third valley parts 911c and the third peak parts 912c are alternately disposed in the circumferential direction. Further, the third valley parts 911c are disposed at equal intervals in the circumferential direction; while the third peak parts 912c are disposed at equal intervals in the circumferential direction. The third valley parts 911c respectively correspond to the first valley parts 911a, whereas the third peak parts 912c respectively correspond to the first peak parts 912a. In other words, the third valley parts 911c respectively correspond to the second peak parts 912b, whereas the third peak parts 912c respectively correspond to the second valley parts 911b.

The third valley parts 911c are respectively disposed away from the corresponding second peak parts 912b in the axial direction. Further, the third peak parts 912c are respectively contacted to the corresponding second valley parts 911b. Yet further, apices 914c of the third peak parts 912c are respectively shifted from apices 913b of the corresponding second valley parts 911b in the circumferential direction. It should be noted that the circumferential shift direction is unidirectional. For example, the apices 914c of the third peak parts 912c are respectively shifted from the apices 913b of the corresponding second valley parts 911b in the circumferentially clockwise direction. Alternatively, the apices 914c of the third peak parts 912c are respectively shifted from the apices 913b of the corresponding second valley parts 911b in the circumferentially counterclockwise direction.

In a side view, an angle α is formed by a line L1 and a straight line L2. The angle α is preferably set to be greater than or equal to roughly 10 degrees and less than or equal to roughly 30 degrees, and is more preferably set to be roughly 20 degrees. The line L1 is herein defined as a line that connects the apices 911a and 913c of each corresponding pair of first and third valley parts 911a and 911c. On the other hand, the straight line L2 is defined as an axially extending line. It should be noted that in a side view, an angle, formed by the axially extending straight line L2 and a line that connects the apices 914a and 914c of each corresponding pair of first and third peak parts 912a and 912c, is also set to be equal to the aforementioned angle α.

Figure 8:
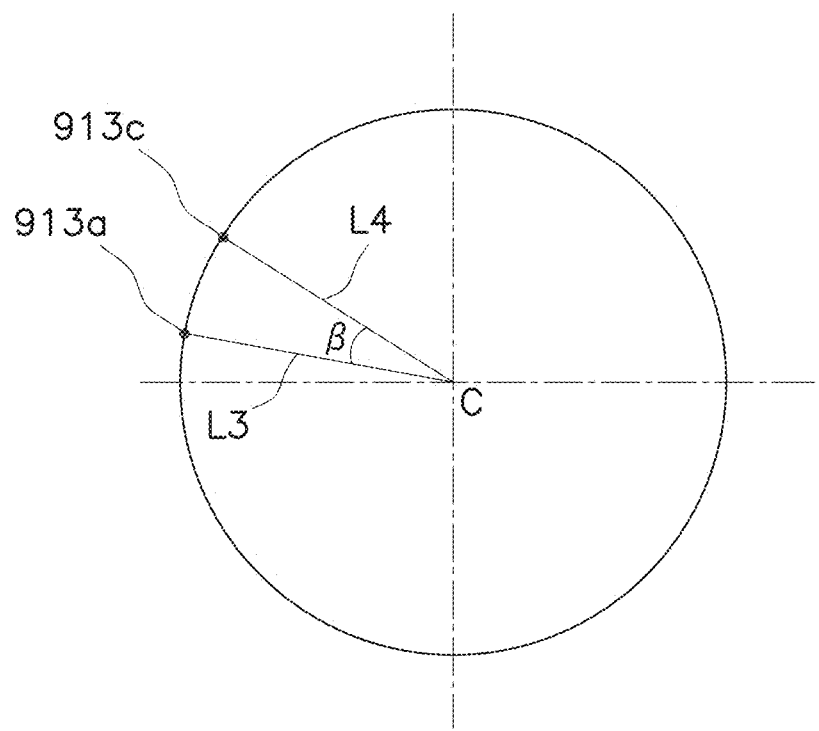
FIG. 8 is a schematic plan view of the coiled wave spring.

FIG. 8 is a schematic plan view of the coiled wave spring 9. As illustrated in a plan view of FIG. 8, an angle β is formed by a line L3 and a line L4, and is preferably set to be greater than 0 degrees and less than or equal to 360/2N degrees. The line L3 is herein defined as a line that connects a center C of the coiled wave spring 9 and the apex 913a of each first valley part 911a. On the other hand, the line L4 is herein defined as a line that connects the center C and the apex 913c of each third valley part 911c. The angle β is an angle formed by the closest pair of lines L3 and L4 in a plan view. Further, the aforementioned N is the number of wavy parts per turn, i.e., the total number of the first valley parts 911a and the first peak parts 912a in the first coiled portion 91a.

Similarly to the above, each of the fourth to tenth coiled portions 91d to 91j has a plurality of valley parts and a plurality of peak parts. Thus, each of the fourth to tenth coiled portions 91d to 91j has the same structure as each of the first to third coiled portions 91a to 91c. Hence, detailed explanation will not be hereinafter made for the fourth to tenth coiled portions 91d to 91j.

As illustrated in FIGS. 5 and 6, the receiver member 54 is a member for receiving the urging force of the coiled wave spring 9 and for applying drag force to the spool 4. The receiver member 54 is a member made of, for instance, metal such as aluminum alloy. The receiver member 54 is mounted onto the spool shaft 15 so as to be non-rotatable and axially movable. The receiver member 54 has a brimmed part 54a and a cylindrical part 54b. The brimmed part 54a radially extends from the front end of the cylindrical part 54b. The cylindrical part 54b has a bottom surface formed on the rear end thereof. Further, the cylindrical part 54b is opened to the front, and accommodates the rear part of the coiled wave spring 9. In other words, the bottom surface of the cylindrical part 54b and the rear surface of the coiled wave spring 9 are contacted to each other.

The cylindrical part 54b has a lock slot 54c bored in the bottom surface thereof. The lock slot 54c is locked onto the pair of lock surfaces 15a of the spool shaft 15. The receiver member 54 is non-rotatable with respect to the spool shaft 15 due to the structure that the lock slot 54c is locked onto the pair of lock surfaces 15a. The cylindrical part 54b has an annular groove 54d formed on the outer peripheral surface thereof. The rear surface of the cylindrical part 54b is contacted to a drag washer 52a of the friction portion 52 through the first support portion 17.

The coupling member 55 is a member formed by bending an elastic wire rod made of metal. The coupling member 55 is a C-shaped spring member that has four corners 55a corresponding to the corners of a roughly square shape. The corners 55a of the coupling member 55 are fitted to the annular groove formed on the inner peripheral surface of the protruding part 23b. Accordingly, the coupling member 55 is mounted to the inner peripheral surface of the protruding part 23b. The coupling member 55 retains the receiver member 54, while three circular-arc sides 55b formed among the four corners 55a are contacted to the rear surface of the brimmed part 54a.

The first seal member 56 is a disc-shaped member made of, for instance, synthetic rubber. The first seal member 56 seals a clearance produced between the drag knob 51 and the spool 4. The first seal member 56 is restricted from backwardly moving by a snap ring 59 to be fitted to the annular groove 54d. The inner peripheral surface of the first seal member 56 is mounted to the cylindrical part 54b of the receiver member 54, while the outer peripheral part thereof is contacted to the inner peripheral surface of the tubular mount part 45a of the tubular support portion 45.

A disc-shaped reinforcement plate 56a, made of stainless alloy, for instance, is buried in the inside of the first seal member 56. The reinforcement plate 56a is inserted into a mold in shaping the first seal member 56, and is thus insert-molded to the first seal member 56. The first seal member 56 has a lip part 56b formed on the outer peripheral part thereof. The lip part 56b is contacted to the inner peripheral surface of the tubular mount part 45a. The lip part 56b slants forward. Further, the first seal member 56 has an annular protruding part 56c forwardly protruding from the front surface thereof. The annular protruding part 56c is contacted to the rear surface of the second seal member 57. Further, the front surface of the lip part 56b of the first seal member 56 is also contacted to the rear end part of the outer peripheral surface of the second seal member 57.

The second seal member 57 is a closed-end tubular member made of, for instance, synthetic rubber. The second seal member 57 seals a clearance produced between the receiver member 54 and the operating member 53. The second seal member 57 is disposed between the first seal member 56 and the operating member 53. The second seal member 57 has a contact part 57a, an annular recessed part 57b and a disc part 57c. The contact part 57a is formed in a tubular shape and is contacted to the outer peripheral surface of the protruding part 23b of the knob main body 23. The annular recessed part 57b is formed on the inner peripheral side of the contact part 57a. The annular recessed part 57b is engaged with the rear end of the protruding part 23b. The disc part 57c is mounted to the outer peripheral surface of the cylindrical part 54b of the receiver member 54.

As illustrated in FIG. 6, the knob sound producing mechanism 58 includes a sound producing disc 581, a hitting pin 582 and a coil spring 583.

The sound producing disc 581 is a member made of synthetic resin. A large number of sound producing recesses 581a are formed on the front surface of the sound producing disc 581, while being circumferentially aligned at intervals. On the other hand, a plurality of joint protrusions 581b are formed on the rear surface of the sound producing disc 581. The joint protrusions 581b are fitted into a plurality of joint holes 54e bored in the brimmed part 54a of the receiver member 54. The sound producing disc 581 is thereby prevented from rotating with respect to the receiver member 54.

The hitting pin 582 is mounted to the knob main body 23 so as to be protrudable therefrom and retractable thereto. The coil spring 583 urges the hitting pin 582 toward the sound producing recesses 581a. The hitting pin 582 is a pin having a tip end rounded in a hemispherical shape, and the middle part thereof has a large diameter while the tip and base ends thereof respectively have small diameters. When the operating member 53 and the receiver member 54 are rotated relatively to each other in a drag operation, the hitting pin 582 is configured to repeatedly collide with the sound producing recesses 581a, and sound is thereby produced.

(Structure of Friction Portion)

As illustrated in FIG. 4, the friction portion 52 includes a plurality of (e.g., four) drag washers 52a to 52d. The drag washer 52a is a disc member made of metal, and is contacted to the first support portion 17 while being non-rotatable with respect to the spool shaft 15. The drag washer 52b is a disc member made of metal, and is configured to be unitarily rotated with the spool 4. Similarly to the drag washer 52a, the drag washer 52c is a disc member made of metal, and is non-rotatable with respect to the spool shaft 15. The drag washer 52d is a disc member made of, for instance, either felt or graphite, and is rotatable with respect to the spool 4 and the spool shaft 15.

Each of the drag washers 52a and 52c has a lock slot 52e bored in the center part thereof. The lock slots 52e are respectively locked onto the pair of lock surfaces 15a of the spool shaft 15. The drag washer 52b has a plurality of (e.g., eight) tabs 52f protruding radially outward from the outer peripheral surface thereof. The tabs 52f are respectively locked to the lock recesses 44a of the tubular drag accommodating portion 44. Accordingly, the drag washer 52b is unitarily rotated with the spool 4.

The drag washers 52a to 52d are retained by the first support portion 17 that supports the tubular support portion 45. Therefore, attachment/detachment of the drag washers 52a to 52d is not allowed unless the retainer spring 47, disposed forward of the tubular support portion 45, is detached.

(Structure of Drag Sound Producing Mechanism)

The drag sound producing mechanism 6 is a mechanism configured to produce sound when the spool shaft 15 and the spool 4 are rotated relatively to each other. As illustrated in FIG. 4, the drag sound producing mechanism 6 includes a first sound producing member 61 and a second sound producing member 62. The first sound producing member 61 is mounted to the rear surface of the rear flange part 4d of the spool 4, and is thereby unitarily rotated with the spool 4. The second sound producing member 62 is a member configured to repeatedly hit the first sound producing member 61.

The first sound producing member 61 is a brimmed cylindrical member made of metal. The first sound producing member 61 has a large number of circular-arc sound producing recesses 61a formed on the inner peripheral surface thereof. A nameplate 63 is disposed on the rear surface of the first sound producing member 61. The first sound producing member 61, together with the nameplate 63, is fixed to the rear surface of the rear flange part 4d by means of screws.

The second sound producing member 62 includes two hitting pins 62a and two spring members 62b. The hitting pins 62.a respectively protrude/retract to/from the sound producing recesses 61a. The spring members 62b respectively urge the hitting pins 62a toward the sound producing recesses 61a. The hitting pins 62a are accommodated in an accommodation member 64.

The accommodation member 64 includes an accommodation main body 64a and a cover 64b. The accommodation main body 64a is a cylindrical member and has two accommodation grooves 64c. The accommodation grooves 64c accommodate the hitting pins 62a such that the hitting pins 62a can protrude/retract therefrom/thereto. The cover 64b closes the accommodation grooves 64c, while being screwed to the accommodation main body 64a. Further, the cover 64b is engaged with the second support portion 18. When described in detail, the cover 64b has a lock slot 64d formed on the inner peripheral surface thereof. The lock slot 64d is engaged with the second lock surfaces 18d. A washer 101 is disposed between the accommodation member 64 and the support wall part 4b of the spool 4.

Three spool position adjusting washers 102 and two restriction washers 103 and 104 are mounted to the rear surface of the cover 64b. The spool position adjusting washers 102 are respectively engaged with the first lock surfaces 18c of the second support portion 18. Further, the spool position adjusting washers 102 are respectively made of for instance, synthetic resin. The restriction washers 103 and 104 respectively restrict the spool 4 from moving rearward. The restriction washer 103 has a lock slot 103a bored in the inner peripheral part thereof. Similarly, the restriction washer 104 has a lock slot 104a bored in the inner peripheral part thereof. The lock slots 103 and 104a are engaged with the pair of lock surfaces 15a of the spool shaft 15. Therefore, the restriction washers 103 and 104 are non-rotatable with respect to the spool shaft 15. The restriction washer 104 is a stepped washer, and holds a third seal member 105 together with the restriction washer 103. The outer peripheral part of the third seal member 105 is contacted to the inner peripheral surface of the first sound producing member 61. The third seal member 105 is provided for preventing intrusion of liquid into the interior of the spool 4 including the friction portion 52 from the rear side of the spool 4.

(Action of Drag Knob)

Prior to fishing, the brake force for braking the rotation of the spool 4 (i.e., drag force) is regulated in accordance with the size and sort of fish. In regulating the drag force, the drag knob 51 is turned. When the drag knob 51 is turned in the clockwise direction, for instance, the nut portion 22 screwed onto the spool shaft 15 is moved to the rearward (i.e., rightward in FIGS. 3 and 5). In conjunction with proceeding of the nut portion 22, the coiled wave spring 9 urges the receiver member 54 to the rearward. On the other hand, the receiver member 54 receives the urging force of the coiled wave spring 9 and applies the drag force to the spool 4. When described in more detail, the receiver member 54 presses the friction portion 52 through the first support portion 17, and the drag washers 52a to 52d composing the friction portion 52 are respectively engaged with each other by means of friction force. The drag three is thereby applied to the spool 4. It should be noted that the drag force is increased in accordance with the amount of clockwise turning of the drag knob 51.

(Modifications)

The exemplary embodiment of the present invention has been explained above. However, the present invention is not limited to the aforementioned exemplary embodiment, and a variety of changes can be made without departing from the scope of the present invention.

<Modification 1>

In the aforementioned exemplary embodiment, the coiled wave spring 9 has a structure that the valley parts are disposed at equal intervals while the peak parts are disposed at equal intervals. However, the structure of the coiled wave spring 9 is not limited to the above.

<Modification 2>

In the coiled wave spring 9 according to the aforementioned exemplary embodiment, the effective number of turns is set to be 10. However, the effective number of turns may be set to be other than 10.

<Modification 3>

In the aforementioned exemplary embodiment, the coiled wave spring 9 is used for the drag knob 51. However, the application of the coiled wave spring 9 is not limited to the above. Alternatively, the coiled wave spring 9 may be used for the other portions of the spinning reel 10. Further, the coiled wave spring 9 structured as described above can be used for the other fishing reels such as a dual-bearing reel.

What is claimed is:

1. A coiled wave spring in use for a fishing reel, comprising:
a first coiled portion including a single turn, the single turn of the first coiled portion having a plurality of first valley parts and a plurality of first peak parts, the first valley parts and the first peak parts being alternately disposed in a circumferential direction; and
a second coiled portion including a single turn, the single turn of the second coiled portion extending continuously from the first coiled portion, the second coiled portion having a plurality of second peak parts and a plurality of second valley parts, the second peak parts respectively corresponding to the first valley parts, the second valley parts respectively corresponding to the first peak parts,
the first peak parts being disposed away from the respectively corresponding second valley parts at a first interval in an axial direction,
the first valley parts contacting the respectively corresponding second peak parts, and
apices of the first valley parts being shifted from respective apices of the corresponding second peak parts in the circumferential direction,
the first valley parts being disposed at equal intervals in the circumferential direction, and the first peak parts being disposed at equal intervals in the circumferential direction.

2. The coiled wave spring according to claim 1, further comprising:
a third coiled portion including a single turn, the single turn of the third coiled portion extending continuously from the second coiled portion, the third coiled portion having a plurality of third valley parts and a plurality of third peak parts, the third valley parts respectively corresponding to the first valley parts and the second peak parts, the third peak parts respectively corresponding to the first peak parts and the second valley parts,
the third valley parts being disposed away from the corresponding second peak parts at a second interval in the axial direction,
the third peak parts contacting the corresponding second valley parts, and
apices of the third peak parts being shifted from respective apices of the corresponding second valley parts in the circumferential direction.

3. The coiled wave spring according to claim 2, wherein the first valley parts are disposed at equal intervals in the circumferential direction, and the first peak parts are disposed at equal intervals in the circumferential direction.

4. A drag knob for regulating a drag force of a drag mechanism configured to brake a rotation of a spool rotatably mounted to a reel unit of a fishing reel, comprising:
an operating member rotatably mounted to the reel unit;
the coiled wave spring recited in claim 2, the coiled wave spring being configured to be extended and contracted in a rotational axis direction of the operating member in conjunction with a rotation of the operating member; and
a receiving member configured to receive an urging force of the coiled wave spring and apply the drag force to the spool.

5. A drag knob for regulating a drag force of a drag mechanism configured to brake a rotation of a spool rotatably mounted to a reel unit of a fishing reel, comprising:
an operating member rotatably mounted to the reel unit;
the coiled wave spring recited in claim 1, the coiled wave spring being configured to he extended and contracted in a rotational axis direction of the operating member in conjunction with a rotation of the operating member; and
a receiving member configured to receive an urging force of the coiled wave spring and apply the drag force to the spool.

6. The coiled wave spring according to claim 1, wherein the first peaks are adjacent peaks disposed at equal intervals.

7. A coiled wave spring in use for a fishing reel, comprising;
a first coiled portion including a single turn, the single turn of the first coiled portion having a plurality of first valley parts and a plurality of first peak parts, the first valley parts and the first peak parts being alternately disposed in a circumferential direction;

a second coiled portion including a single turn, the single turn of the second coiled portion extending continuously from the first coiled portion, the second coiled portion having a plurality of second peak parts and a plurality of second valley parts, the second peak parts respectively corresponding to the first valley parts, the second valley parts respectively corresponding to the first peak parts; and a third coiled portion including a single turn, the single turn of the third coiled portion extending continuously from the second coiled portion, the third coiled portion having a plurality of third valley parts and a plurality of third peak parts, the third valley parts respectively corresponding to the first valley parts and the second peak parts, the third peak parts respectively corresponding to the first peak parts and the second valley parts, the third valley parts being disposed away from the corresponding second peak parts at a second interval in the axial direction, the third peak parts contacting the corresponding second valley parts, apices of the third peak parts being shifted from respective apices of the corresponding second valley parts in the circumferential direction, the first peak parts being disposed away from the respectively corresponding second valley parts at a first interval in an axial direction, the first valley parts contacting the respectively corresponding second peak parts, and apices of the first valley parts being shifted from respective apices of the corresponding second peak parts in the circumferential direction, in a plan view, an angle of greater than 0 degrees and less than or equal to 360/2N degrees being formed by a line connecting the apex of each first valley part and a center of the coiled wave spring and a line connecting the apex of each third valley part corresponding to each first valley part and the center of the coiled wave spring, where N is defined as a total number of the first valley parts and the first peak parts in the first coiled portion.

8. The coiled wave spring according to claim 7, wherein in a side view, an angle of greater than or equal to 10 degrees and less than or equal to 30 degrees is formed by a line connecting each corresponding pair of the apex of each first valley part and the apex of each third valley part and a line extending in the axial direction.

9. The coiled wave spring according to claim 7, wherein the first valley parts are disposed at equal intervals in the circumferential direction and the first peak parts are disposed at equal intervals in the circumferential direction.

10. A drag knob for regulating a drag force of a drag mechanism configured to brake a rotation of a spool rotatably mounted to a reel unit of a fishing reel, comprising:

an operating member rotatably mounted to the reel unit;

the coiled wave spring recited in claim 7, the coiled wave spring being configured to be extended and contracted in a rotational axis direction of the operating member in conjunction with a rotation of the operating member; and a receiving member configured to receive an urging force of the coiled wave spring and apply the drag force to the spool.

11. A coiled wave spring in use for a fishing reel, comprising:

a first coiled portion including a single turn, the single turn of the first coiled portion having a plurality of first valley parts and a plurality of first peak parts, the first valley parts and the first peak parts being alternately disposed in a circumferential direction;

a second coiled portion including a single turn, the single turn of the second coiled portion extending continuously from the first coiled portion, the second coiled portion having a plurality of second peak parts and a plurality of second valley parts, the second peak parts respectively corresponding to the first valley parts, the second valley parts respectively corresponding to the first peak parts; and a third coiled portion including a single turn, the single turn of the third coiled portion extending continuously from the second coiled portion, the third coiled portion having a plurality of third valley parts and a plurality of third peak parts, the third valley parts respectively corresponding to the first valley parts and the second peak parts, the third peak parts respectively corresponding to the first peak parts and the second valley parts, the third valley parts being disposed away from the corresponding second peak parts at a second interval in the axial direction, the third peak parts contacting the corresponding second valley parts, apices of the third peak parts being shifted from respective apices of the corresponding second valley parts in the circumferential direction, the first peak parts being disposed away from the respectively corresponding second valley parts at a first interval in an axial direction, the first valley parts contacting the respectively corresponding second peak parts and apices of the first valley parts being shifted from respective apices of the corresponding second peak parts in the circumferential direction, in a side view, an angle of greater than or equal to 10 degrees and less than or equal to 30 degrees being formed by a line connecting each corresponding pair of the apex of each first valley part and the apex of each third valley part and a line extending in the axial direction.

12. The coiled wave spring according to claim 11, wherein the first valley parts are disposed at equal intervals in the circumferential direction and the first peak parts are disposed at equal intervals in the circumferential direction.

13. A drag knob for regulating a drag force of a drag mechanism configured to brake a rotation of a spool rotatably mounted to a reel unit of a fishing reel, comprising:

an operating member rotatably mounted to the reel unit;

the coiled wave spring recited in claim 11, the coiled wave spring being configured to be extended and contracted in a rotational axis direction of the operating member in conjunction with a rotation of the operating member; and a receiving member configured to receive an urging force of the coiled wave spring and apply the drag force to the spool.

* * * * *